United States Patent
Yokoyama et al.

(10) Patent No.: US 9,126,526 B2
(45) Date of Patent: Sep. 8, 2015

(54) VEHICLE APPROACH INFORMATION DEVICE WITH VOLUME CONTROL

(71) Applicant: Fuji Jukogyo Kabushiki Kaisha, Tokyo (JP)

(72) Inventors: Yutaka Yokoyama, Tokyo (JP); Hiroaki Kanaya, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 14/168,950

(22) Filed: Jan. 30, 2014

(65) Prior Publication Data

US 2014/0210602 A1  Jul. 31, 2014

(30) Foreign Application Priority Data

Jan. 31, 2013  (JP) ................................. 2013-017163

(51) Int. Cl.
  *G08B 21/00*  (2006.01)
  *B60Q 5/00*  (2006.01)

(52) U.S. Cl.
  CPC ............... *B60Q 5/006* (2013.01); *B60Q 5/008* (2013.01)

(58) Field of Classification Search
  CPC ................................ B60Q 5/006; B60Q 5/008
  USPC ............. 340/435, 436, 437, 463, 903; 701/36
  See application file for complete search history.

(56) References Cited

U.S. PATENT DOCUMENTS

| 8,958,947 B2 | 2/2015 | Inakazu et al. |
| 2014/0225726 A1 | 8/2014 | Kanaya et al. |
| 2014/0226835 A1 | 8/2014 | Kanaya et al. |

FOREIGN PATENT DOCUMENTS

| JP | 2006-298111 | 11/2006 |
| JP | 2009-040318 | 2/2009 |
| JP | 2011-148435 | 8/2011 |
| JP | 2012-201316 | 10/2012 |
| WO | 2011/104755 | 9/2011 |

*Primary Examiner* — Jeffery Hofsass
(74) *Attorney, Agent, or Firm* — Smith, Gambrell & Russell, LLP

(57) ABSTRACT

A vehicle approach informing device includes: an informing sound output unit mounted on a vehicle and configured to inform of approach of the vehicle by transmitting sound to the outside; a distance measurement unit to detect a current position of the vehicle and to measure a distance between the detected current position and a predetermined position; and a sound volume control unit configured to set a sound volume outputted by the informing sound output unit to a predetermined normal sound volume when the distance measured by the distance measurement unit is equal to or longer than a first distance, and to set the sound volume to a lower level than the normal sound volume when the distance measured by the distance measurement unit is shorter than the first distance.

4 Claims, 5 Drawing Sheets

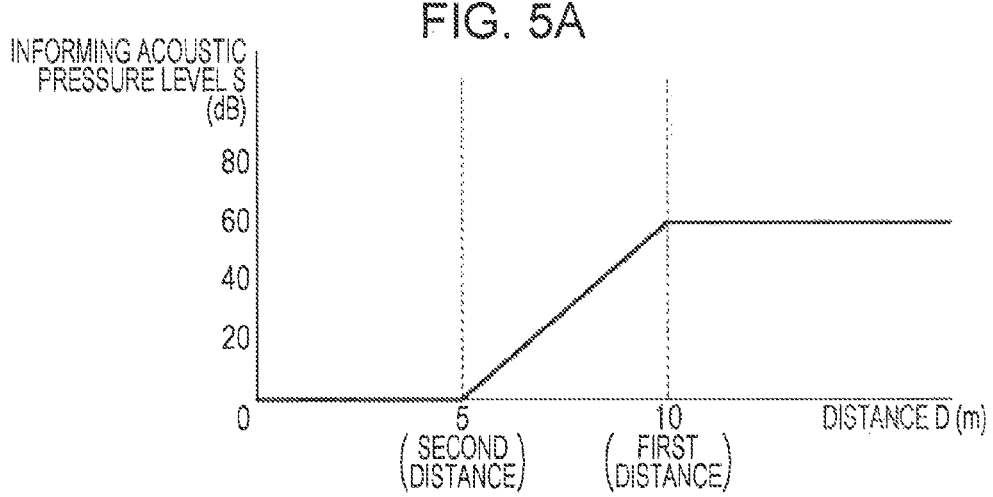
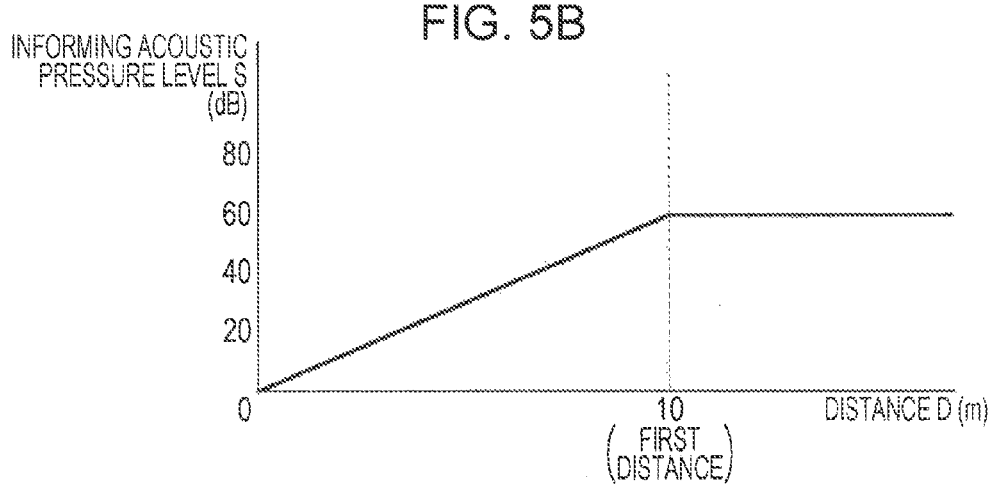
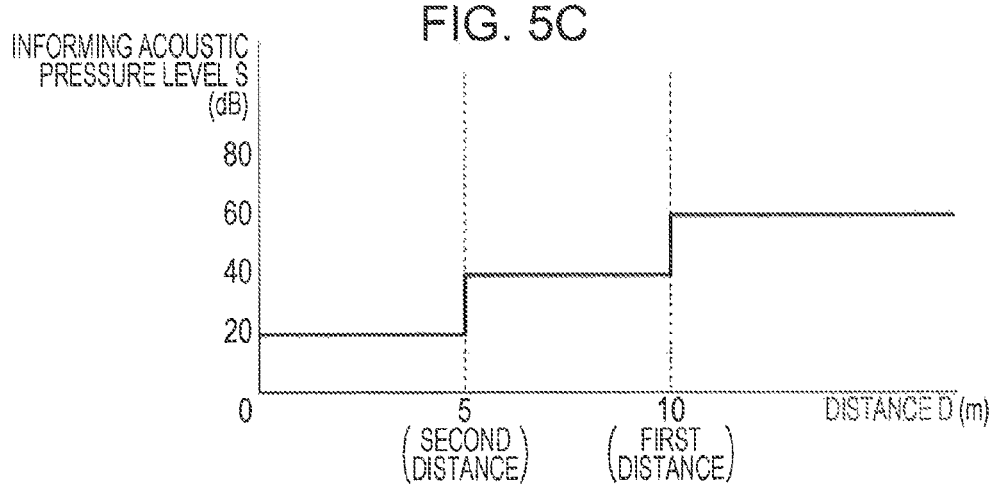

VEHICLE APPROACH INFORMATION DEVICE WITH VOLUME CONTROL

CROSS-REFERENCE TO RELATED APPLICATIONS

The present application claims priority from Japanese Patent Application No. 2013-017163 filed on Jan. 31, 2013, the entire contents of which are hereby incorporated by reference.

BACKGROUND

1. Technical Field

The present invention relates to a vehicle approach informing device configured to inform pedestrians outside a vehicle that the vehicle is approaching.

2. Related Art

Conventional vehicles are primarily a gasoline-powered vehicle which runs using an engine as a drive source, and so a pedestrian can identify the presence of a vehicle by the engine sound generated by the vehicle when the vehicle is approaching from the rear or a blind spot of the pedestrian. However, no engine sound is generated by vehicles such as an electric vehicle and a hybrid vehicle which run using an electric motor as a drive source, and it is difficult for a pedestrian to identify the presence of such a vehicle by the sound of the vehicle when the vehicle is approaching the pedestrian.

Thus, vehicles equipped with an informing device have been proposed, the informing device being configured to output sound for informing people outside the vehicle such as pedestrians that the vehicle is approaching. For example, Japanese Unexamined Patent Application Publication No. 2009-40318 discloses a vehicle approach informing device configured to output simulated sound of tire noise from a speaker provided at the front end of a vehicle when the vehicle is running at a speed lower than or equal to a predetermined vehicle speed, the simulated sound having the same tone as that of the actual tire noise.

However, sound for informing pedestrians of the approach of a vehicle may be an annoying noise to the surroundings. For example, vehicles often run at a low speed in an area near the residence thereof, thus the sound for informing pedestrians of vehicle approach is constantly emitted. Thus, frequently emitted sound for informing of vehicle approach may be an annoying noise which is a nuisance to the neighbors. On the other hand, however, when the sound for informing of vehicle approach is designed to be turned off by a driver at will, the driver may continue to drive the vehicle without being aware that the informing sound has been turned off, and thus this design is not desirable.

SUMMARY OF THE INVENTION

The present invention has been designed in consideration of the circumstances described above, and an object thereof is to provide a vehicle approach informing device that prevents the informing sound from being an annoying noise.

An aspect of the present invention provides a vehicle approach informing device including: an informing sound output unit mounted on a vehicle and configured to inform the approach of the vehicle by transmitting sound to the outside; a distance measurement unit to detect a current position of the vehicle and to measure a distance between the detected current position and a predetermined position; and a sound volume control unit to set a sound volume outputted by the informing sound output unit to a predetermined normal sound volume when the distance measured by the distance measurement unit is equal to or longer than a first distance, and to set the sound volume to a lower level than the normal sound volume when the distance measured by the distance measurement unit is shorter than the first distance.

Preferably, when the distance measured by the distance measurement unit is shorter than the first distance, the sound volume control unit reduces the sound volume outputted by the informing sound output unit stepwise as the measured distance decreases.

Preferably, when the distance measured by the distance measurement unit is shorter than a second distance which is shorter than the first distance, the sound volume control unit may stop outputting sound.

Preferably, the distance measurement unit measures a distance between the vehicle and the predetermined position by receiving radio waves sent from the predetermined position.

Preferably, the vehicle approach informing device further includes a position input unit to receive an input operation to set a predetermined position for measuring a distance from the current position of the vehicle by the distance measurement unit.

BRIEF DESCRIPTION OF THE DRAWINGS

FIGS. 5A, 5B and 5C each illustrate in a graphical fashion a relationship between an acoustic pressure for informing of vehicle approach and the distance from the current position of the vehicle to a predetermined position in modified implementations, as shown in the graph illustration.

DETAILED DESCRIPTION

Figure 1:
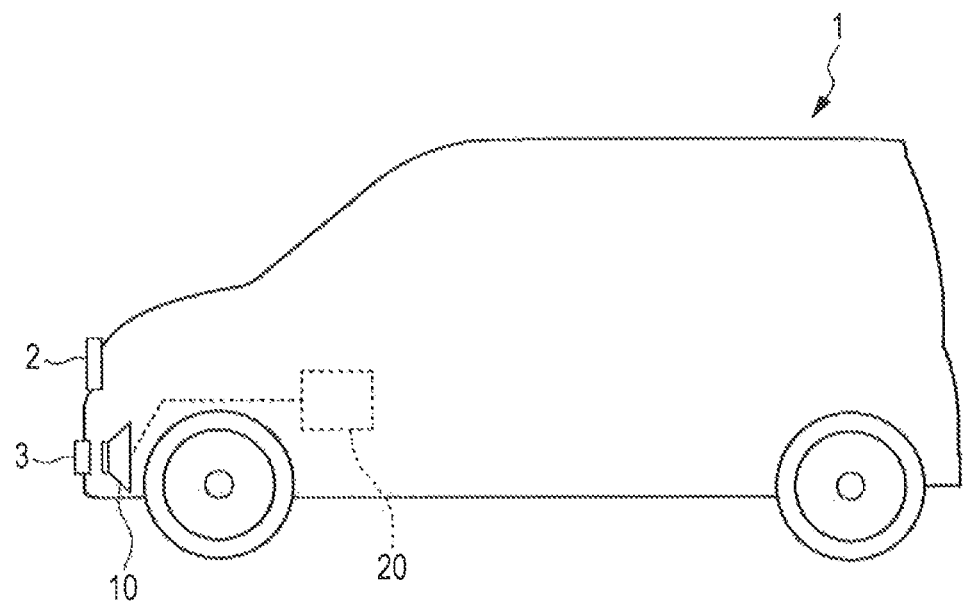
FIG. 1 is an overall configuration diagram of a vehicle.

Hereinafter, a preferable implementation of the present invention is described in detail with reference to the accompanying drawings. As illustrated in FIG. 1, a vehicle 1 provided with a vehicle approach informing device includes a pair of right and left informing speakers 10 in the front of the vehicle 1, and a vehicle approach informing controller 20 connected to the informing speakers 10 in the vehicle 1. In the present implementation, each of the informing speakers 10 corresponds to the informing sound output unit, and the vehicle approach informing controller 20 corresponds to the sound volume control unit of the present invention.

The informing speakers 10 are respectively disposed near the rear surfaces of a pair of right and left fog lamps 3 which are disposed below headlights 2 at the front end of the vehicle 1. The diaphragm of each informing speaker 10 is cone type and disposed to face the rear of the vehicle 1. In the present implementation, the vehicle 1 includes two piece of the informing speaker 10 or further additional pieces of the informing speaker 10 at the rear or a side of the vehicle 1.

Figure 2:
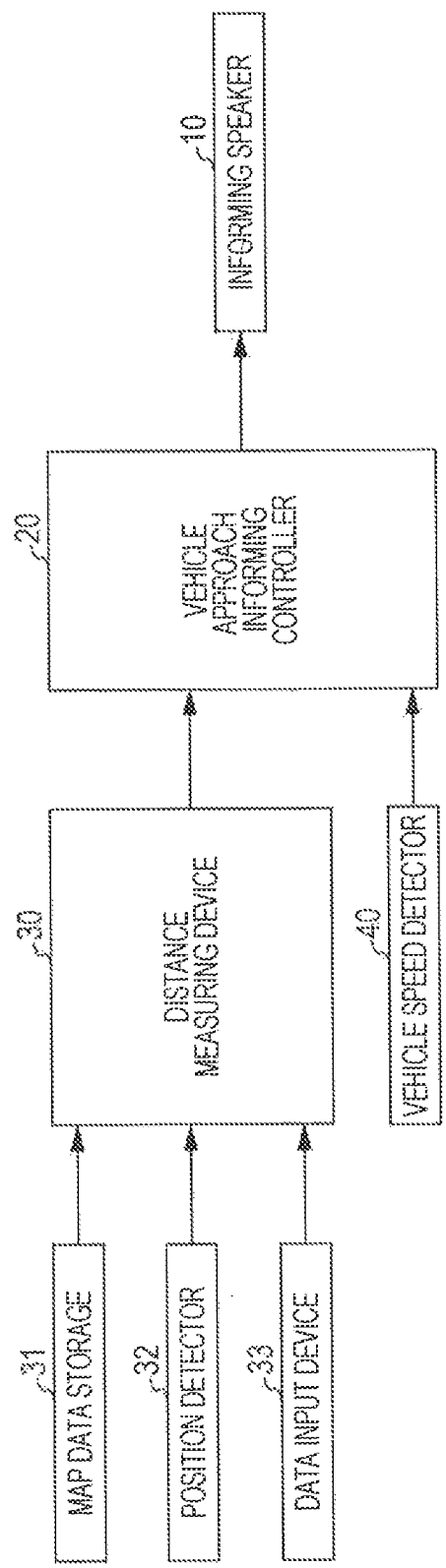
FIG. 2 is a block diagram of a vehicle approach informing device.

As illustrated in FIG. 2, the output side of the vehicle approach informing controller 20 is electrically connected to the informing speaker 10. Thus, an informing sound output signal is outputted from the vehicle approach informing controller 20 to the informing speaker 10. The input side of the vehicle approach informing controller 20 is electrically connected to a distance measuring device 30 for measuring the distance between the current position of the vehicle 1 and a reference position to be described below, and a vehicle speed detector 40 for detecting the running speed of the vehicle 1. Thus, the vehicle approach informing controller 20 receives distance information from the distance measuring device 30 and a detected vehicle speed signal from the vehicle speed detector 40.

The input side of the distance measuring device 30 is connected to a map data storage 31 for a storing map data base, a position detector 32 for detecting the current position of the vehicle 1, and a data input device 33 via which a user (occupant of the vehicle 1) optionally sets a reference position, with respect to which the distance measuring device 30 measures a distance. Thus, the distance measuring device 30 receives map information from the map data storage 31, information on the current position of the vehicle 1 from the position detector 32, and information on the reference position from the data input device 33.

The map data storage 31 includes a storage medium such as a hard disk, which stores a map data base including information on roads on which the vehicle 1 runs, and position information based on addresses.

The position detector 32 is a GPS receiver which is a device for measuring the current position of the vehicle 1 based on positioning signals from GPS satellites. When the vehicle 1 is provided with a navigation device, the map data storage 31 and the position detector 32 may be used as a navigation system.

The data input device 33 includes a touch panel, via which a user can perform a setting operation. By an input operation to the data input device 33, a user can optionally set a position used as a reference (reference position), with respect to which the distance measuring device 30 measures a distance. The reference position is preferably set at a location where the vehicle 1 frequently runs at a low speed, such as the residence of the user and the parking lot of the user's office. The reference position is set by an input method such as touching any position on the display of the map which is stored in the map data storage 31, and inputting an address. In addition, only one reference position or multiple reference positions may be set.

The distance measuring device 30 measures a distance D between the current position of the vehicle 1 and the reference position based on the map information inputted via the map data storage 31, the current position of the vehicle 1 being inputted from the position detector 32, the reference position being inputted via the data input device 33. Specifically, the distance measuring device 30 reflects the current position of the vehicle 1 and the reference position to the map information, and measures the distance on the map from the current position of the vehicle 1 to the reference position. In the present implementation, the distance D is a distance travelled based on the data of the road from the current position of the vehicle 1 to the reference position. However, the distance D may be a distance as the crow flies from the current position of the vehicle 1 to a reference position. In the present embodiment, the distance measuring device 30 for measuring the distance D corresponds to the distance measuring unit of the present invention. The distance measuring device 30 inputs the current position of the vehicle 1 for every predetermined period (for example, 4 milliseconds) to measure the distance D.

In the present implementation, the distance measuring device 30 measures the distance P from the current position of the vehicle 1 to the reference position based on the map information, the current position information of the vehicle 1, and the reference position information. However, without being limited to this, for example, a transmitter for transmitting radio waves or infrared rays may be installed at the reference position, and the distance D from the vehicle 1 to the reference position may be measured using a receiver mounted on the vehicle 1 to receive the radio waves or infrared rays.

When it is detected that the speed of the vehicle 1 is lower than or equal to a predetermined vehicle speed (10 km/h in the present implementation), the vehicle speed detector 40 outputs a detected vehicle speed signal.

The vehicle approach informing controller 20 is an electronic control unit (ECU), which performs a procedure for informing the outside that the vehicle 1 is approaching by analyzing various input signals and an outputting control signal to the informing speaker 10.

Figure 3:
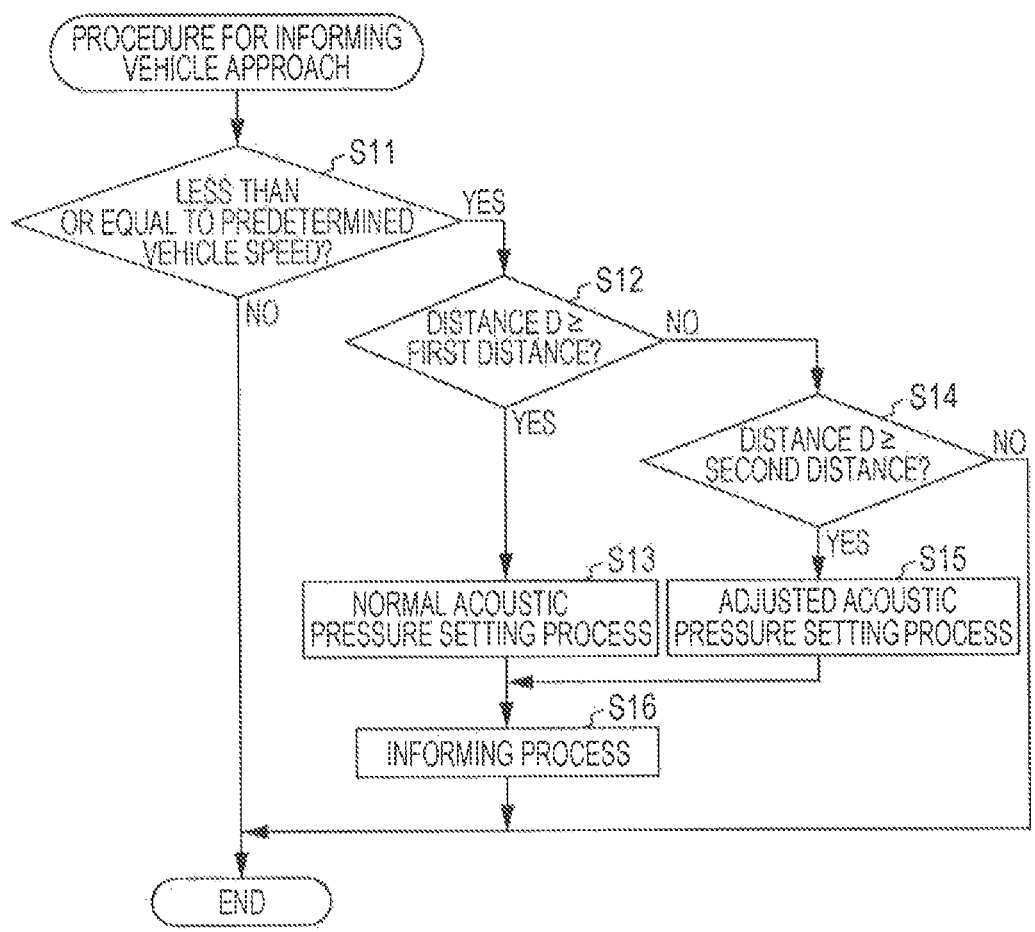
FIG. 3 is a flow chart illustrating a vehicle approach informing procedure.

Hereinafter, the vehicle approach informing procedure for informing of approach of the vehicle 1 to the outside will be described with reference to FIGS. 3 and 4. The procedure flow illustrated in FIG. 3 is performed for every predetermined period (for example, 4 milliseconds).

First, in step S11, the vehicle approach informing controller 20 determines whether or not the speed of the vehicle 1 is lower than or equal to a predetermined vehicle speed (10 km/h). Specifically, if a detected vehicle speed signal is inputted from the vehicle speed detector 40, it is determined that the speed of the vehicle 1 is lower than or equal to the predetermined vehicle speed, and if no detected vehicle speed signal is inputted from the vehicle speed detector 40, it is determined that the speed of the vehicle 1 is higher than the predetermined vehicle speed. If it is determined that the speed of the vehicle 1 is lower than or equal to the predetermined vehicle speed, the procedure proceeds to step S12, and if it is determined that the speed of the vehicle 1 is higher than the predetermined vehicle speed, the vehicle approach informing procedure is terminated.

In step S12, the vehicle approach informing controller 20 analyzes the distance information inputted from the distance measuring device 30, and determines whether or not the distance D is longer than or equal to a first distance (10 m in the present implementation). If the distance D is longer than or equal to the first distance, the procedure proceeds to step S13, and if the distance D is less than the first distance, the procedure proceeds to step S14.

In step S13, the vehicle approach informing controller 20 performs a process of setting an acoustic pressure S of informing sound for informing the approach of the vehicle 1 to a normal acoustic pressure. In the present implementation, the normal acoustic pressure is 60 dB. Thus, as illustrated in FIG. 4, if the distance D is longer than or equal to the first distance, that is, if the current position of the vehicle 1 is away from the reference position by a distance greater than or equal to 10 m, the informing acoustic pressure S is set to the normal acoustic pressure. If the process is completed, the procedure proceeds to step S16.

In step S14, the vehicle approach informing controller 20 analyzes the distance information inputted from the distance measuring device 30, and determines whether or not the distance P is longer than or equal to a second distance (5 m in the present implementation). If the distance P is longer than or equal to the second distance, the procedure proceeds to step S15, and if the distance P is less than the second distance, the vehicle approach informing procedure is terminated.

Thus, if the distance P is shorter than the second distance, that is, if the current position of the vehicle 1 is within 5 m from the reference position, the process of informing the approach of the vehicle 1 is not performed. In the present implementation, if the distance D is shorter than the second distance, the process of informing the approach of the vehicle 1 is not performed. However, without being limited to this, pedestrians may be informed of the approach of the vehicle 1 with the informing sound muffled (the acoustic pressure S of the informing sound being set to 0 dB). For example, if pedestrians outside the vehicle 1 are informed of the approach of the vehicle 1 by another method such as lighting a lamp as well as by outputting informing sound, only the lighting of the lamp is performed.

In step S15, the vehicle approach informing controller 20 performs a process of setting the acoustic pressure S of informing sound to an adjusted acoustic pressure, the informing sound for informing of approach of the vehicle 1. In the present implementation, the adjusted acoustic pressure is an acoustic pressure corresponding to the distance information inputted from the distance measuring device 30. Specifically, as illustrated in FIG. 4, the informing acoustic pressure S is set to a lower value with the lower limit of 30 dB as the distance D is closer to the second distance. For example, when the distance D is 7.5 m which is the mean value of the first distance and the second distance, the informing acoustic pressure S is set to 45 dB. When the distance D is 5 m which is the second distance, the informing acoustic pressure S is set to 30 dB. In this manner, when the distance D is between the first distance and the second distance, that is to say, when the current position of the vehicle 1 is away from the reference position by a distance of 5 to 10 m, the informing acoustic pressure S is set to a lower value as the distance D decreases.

In step S16, the vehicle approach informing controller 20 performs an informing process of outputting informing sound for informing of approach of the vehicle 1 from the informing speaker 10, the informing sound. Specifically, the vehicle approach informing controller 20 outputs an informing sound output signal to the informing speaker 10. The informing sound output signal for outputting informing sound has the acoustic pressure S which has been set in step S13 or step S15 described above.

Figure 4:
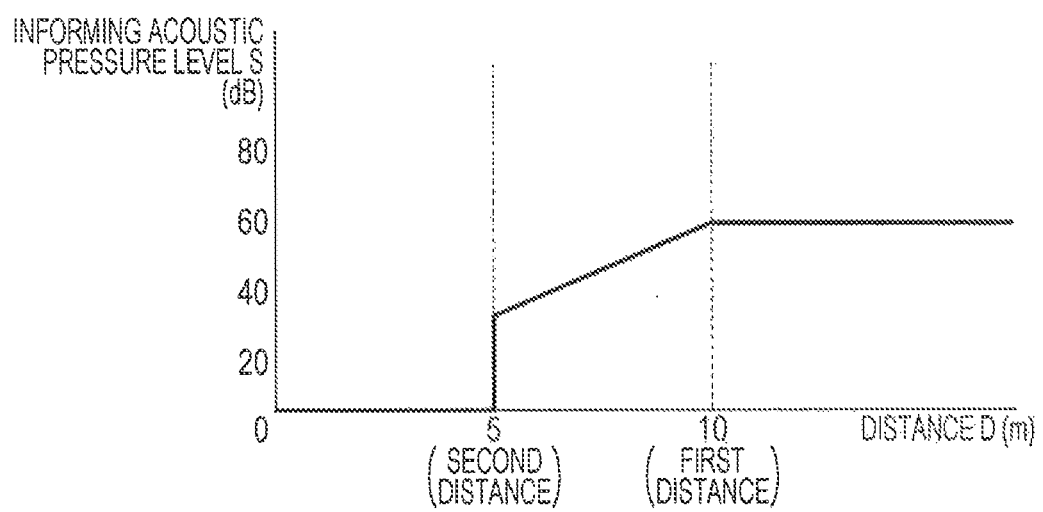
FIG. 4 is a graph illustrating a relationship between an acoustic pressure for informing of vehicle approach and the distance from the current position of the vehicle to a predetermined position.

In this manner, in the case where the speed of the vehicle 1 is lower than or equal to the predetermined vehicle speed, as illustrated in FIG. 4, if the distance D is longer than or equal to the first distance, informing sound having the normal acoustic pressure is outputted from the informing speaker 10, and if the distance D is between the first distance and the second distance, informing sound having the adjusted acoustic pressure is outputted from the informing speaker 10. Even when that the speed of the vehicle 1 is shorter than or equal to the predetermined vehicle speed, the informing sound is not outputted if the distance D is shorter than 5 m. In the present implementation, the sound volume which is outputted from the informing speaker 10 with the normal acoustic pressure (60 dB) corresponds to a first sound volume, and the sound volume which is outputted from the informing speaker 10 with an adjusted acoustic pressure (30 to 60 dB) corresponds to a second sound volume.

As described above, when the vehicle 1 is away from the reference position by a distance greater than or equal to the first distance, informing sound having the normal acoustic pressure is outputted. On the other hand, when the vehicle 1 is away from the reference position by a distance shorter than the first distance, the informing acoustic pressure S is reduced, and informing sound having the adjusted acoustic pressure lower than the normal acoustic pressure is outputted. In the above case, the informing acoustic pressure S is set to a lower value as the current position of the vehicle 1 approaches the reference position. When the vehicle 1 is away from the reference position by a distance shorter than the second distance, informing sound is not outputted (0 dB). That is to say, when the vehicle 1 approaches the reference position to within the first distance, the acoustic pressure of informing sound is reduced. When the vehicle 1 further approaches the reference position to within the second distance, the output of informing sound is stopped. Thus, for example, when the reference position is set in an area where the vehicle 1 frequently runs at a low speed, such as the residence of the user, informing sound is prevented from being an annoying noise which is a nuisance to the neighbors. Because the acoustic pressure S of informing sound varies according to variation in the distance D, the user does not need to muffle the informing sound himself or herself. Therefore, the user is prevented from continuing to drive without being aware that the informing sound has been turned off.

Hereinafter, the reduction of the acoustic pressure S of informing sound for informing the outside of the approach of the vehicle 1 according to other implementations will be described with reference to FIGS. 5A, 5B, and 5C. The reduction is performed when the distance D is shorter than the first distance (when the vehicle 1 is away from the reference position by a distance shorter than the first distance).

In the implementation illustrated in FIG. 5A, the adjusted acoustic pressure is set when the distance U is between the first distance and the second distance. In this implementation, the informing acoustic pressure S is set to a lower value as the distance D shorter than the first distance is closer to the second distance. When the distance D reaches the second distance, the informing acoustic pressure S is set to 0 dB. That is to say, when the vehicle 1 approaches the reference position to within the first distance, the informing acoustic pressure S is gradually reduced. When the vehicle 1 reaches a point away from the reference position by the second distance, the informing acoustic pressure S is set to and remains at 0 dB (muffled) until the vehicle 1 reaches the reference position. The informing acoustic pressure S may be set to 0 dB when the distance D is shorter than the first distance.

In the implementation illustrated in FIG. 5B, when the distance D is less than the first distance, an adjusted acoustic pressure is set. In this implementation, the informing acoustic pressure S is set to a lower value as the distance D decreases, and the informing acoustic pressure S is set to 0 dB when the distance D becomes 0. That is to say, the set informing acoustic pressure S is reduced as the vehicle 1 approaches the reference position, and the informing acoustic pressure S is set to 0 dB when the vehicle 1 reaches the reference position. Thus, when the distance D is shorter than the first distance, the distance D is in direct proportion to the informing acoustic pressure S. In this manner, the informing acoustic pressure S is reduced as the vehicle 1 approaches the reference position, and thus the informing sound is prevented from being an annoying noise in a nearby area of the reference position. In addition, the informing sound is not muffled until the vehicle 1 reaches the reference position, thus pedestrians in the nearby area can be constantly informed of the approach of the vehicle 1.

In the implementation illustrated in FIG. 5C, when the distance D is longer than or equal to the first distance, the informing acoustic pressure S is set to 60 dB. When the distance D is shorter than the first distance and longer than or equal to the second distance, the informing acoustic pressure S is set to 40 dB. When the distance D is shorter than the second distance, the informing acoustic pressure S is set to 20 dB. That is to say, the informing acoustic pressure S changes in three stages according to the distance D: when the vehicle 1 approaches the reference position to within the first distance, the acoustic pressure of informing sound is reduced by one stage; and when the vehicle 1 further approaches the reference position to within the second distance, the acoustic pressure of informing sound is further reduced by one stage. The informing acoustic pressure S may be changed in multiple stages instead of three stages.

In the present implementation, pedestrians are informed of the approach of the vehicle 1 on the condition that the speed of the vehicle 1 is lower than or equal to the predetermined vehicle speed. However, without being limited to this, pedestrians may be informed of the approach of the vehicle 1 on another condition.

The invention claimed is:

1. A vehicle approach informing device comprising:
    an informing sound output unit mounted on a vehicle and configured to inform the approach of the vehicle by transmitting sound to the outside;
    a distance measurement unit to detect a current position of the vehicle and to measure a distance between the detected current position and a predetermined position; and
    a sound volume control unit to set a sound volume outputted by the informing sound output unit to a predetermined normal sound volume when the distance measured by the distance measurement unit is equal to or longer than a first distance, and to set the sound volume to a lower level than the normal sound volume when the distance measured by the distance measurement unit is shorter than the first distance, wherein
    when the distance measured by the distance measurement unit is shorter than the first distance, the sound volume control unit reduces the sound volume outputted by the informing sound output unit stepwise as the measured distance decreases, and
    when the distance measured by the distance measurement unit is shorter than a second distance that is shorter than the first distance, the sound volume control unit stops outputting sound.

2. The vehicle approach informing device according to claim 1,
    wherein the distance measurement unit measures a distance between the vehicle and the predetermined position by receiving radio waves which are sent from the predetermined position.

3. The vehicle approach informing device according to claim 1, further comprising
    a position input unit to receive an input operation to set a predetermined position for measuring a distance from the current position of the vehicle by the distance measurement unit.

4. The vehicle approach informing device according to claim 2, further comprising
    a position input unit to receive an input operation to set a predetermined position for measuring a distance from the current position of the vehicle by the distance measurement unit.

* * * * *